(No Model.)
L. ROBINSON.
Pattern Chart and Square for Measuring and Drafting Dresses.
No. 242,696.          Patented June 7, 1881.
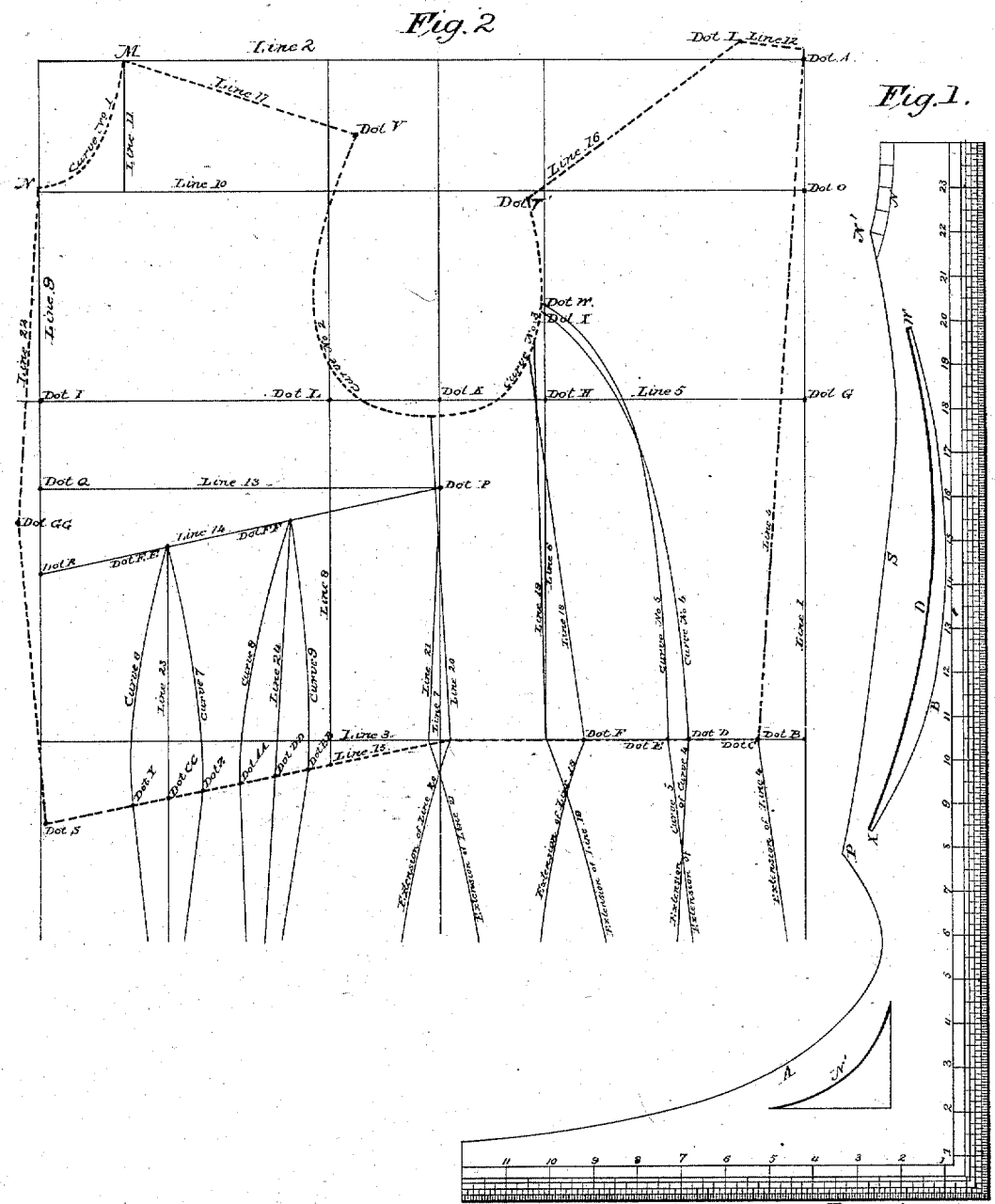

UNITED STATES PATENT OFFICE.

LUCIE ROBINSON, OF OSWEGO, NEW YORK.

PATTERN CHART AND SQUARE FOR MEASURING AND DRAFTING DRESSES.

SPECIFICATION forming part of Letters Patent No. 242,696, dated June 7, 1881.

Application filed February 4, 1881. (No model.)

*To all whom it may concern:*

Be it known that I, LUCIE ROBINSON, of Oswego, in the county of Oswego and State of New York, have invented certain new and useful Improvements in Systems of Cutting and Fitting Garments; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a simple device or instrument to be used in connection with a common tape-line in laying down the dimensions of the various portions of the human form above the waist-line from accurate measurements according to a new system, for the production of patterns to be used in cutting garments for ladies and children.

My invention consists, first, in a "scale" or "square" of peculiar form, marked with inches and subdivisions of inches, and provided with lines, curves, figures, and marks, as represented in the drawings, all of which are utilized in the practical working of my improved system of drawing dress-patterns; and, second, in the manner of using this scale or square, hereinafter specified.

The square or scale referred to is clearly represented in Figure 1 of the drawings. Inches and subdivisions of inches are marked on the straight edges, as on a common square, and are brought into use in laying down the lines and curves, in the manner hereinafter described.

On the inner side of the square or scale is a curve, (marked A,) forming part of the inside edge. This curve is designed to aid in shaping the arm-scye, and the manner of its use is hereinafter described. Parallel with A is a short curve, (marked N,) which is used in shaping the front of neck. Adjoining curve A is an irregular edge, commencing at P and ending at N'. This edge is used in shaping the waist at the sides of the front and back.

The inner edge of square, opposite figures 22 and 23, forms a short curve, (marked N',) subdivided into four half-inches. This is used for shaping the back of neck.

The long slot in the square marked X, B, D, and W is used in the following manner: the side marked B in shaping the side forms of back; the side marked D in shaping the darts. The letters X and W mark the ends of these curves.

The directions for using square or scale refer to eleven distinct measurements, as exhibited on the diagram Fig. 2. Every line and curve drawn on the diagram must correspond with the measurement for that particular part of the person for which the pattern is being prepared. These measurements are as follows in the case of the pattern referred to in this specification: first, neck, eleven inches; second, shoulder, six inches; third, arm-scye, fifteen inches; fourth, under arm, eight inches; fifth, length of back, sixteen inches; sixth, width of back, twelve inches; seventh, length of front, fifteen inches; eighth, length of front from back of neck to waist, nineteen and one-half inches; ninth, waist, twenty-four inches; tenth, bust, thirty-six inches; eleventh, hip, forty inches.

Directions: As a base-line for the diagram for waist-pattern, I draw straight line marked No. 1 on a sheet of paper near and parallel to the bottom edge, and draw line No. 2 at right angles to it near the right-hand edge of the sheet. This is called "squaring off," and these lines form the co-ordinates from which the different parts of the waist are measured and laid down.

The first step in figuring the waist-pattern is to lay down the length of back. In the diagram this is supposed to be sixteen inches, measuring from back of neck to waist-line. This is laid down by placing the long edge of square or scale on line 1, so that the figure 16 on square or scale is on dot A at the junction of lines 1 and 2, and making dot B at the angle of the square on line 1. From this point draw line 3 across the paper parallel to line 2. This line forms the ordinate for the waist-line, and all lines and curves forming the pattern for the different parts of waist are measured upward from it.

The next step is to obtain the width at waist-line of the different parts of the back. On line 3 make dot C one inch from dot B, dot D one and a half inch from dot C, dot E one-half inch from dot D, and dot F two inches from dot E. Then draw line No. 4 from dot A to dot C. This line indicates the center seam of the back.

The next step is to obtain length of waist from armpit to waist-line. (This measure is supposed to be eight inches.) I make dot G on line 1 eight inches from dot B, and from dot G draw line 5 across the paper parallel to lines 2 and 3. This line indicates the length of waist from armpit to waist-line, the width of back, the foundation of arm-scye, and the width of bust.

The next step is to locate these different measures in their proper places on line 5. To do this I first mark width of back by making dot H on line 5 six inches from dot G on line 1, being half the supposed width of back-measure. The base-line of arm-scye measure is obtained by making dot L on line 5 just five inches from dot H, (this being one-third the arm-scye measure, which is supposed to be fifteen inches,) and dot K half-way between dots H and L.

Next indicate width of bust-measure (which in these measures is supposed to be sixteen inches) by making dot Q at intersection of lines 9 and 13.

Next square off these different measures by drawing line No. 6 from waist-line No. 3, parallel to line No. 1, through dot H to line No. 2; line No. 7 from waist-line No. 3 through dot K to line No. 2; line No. 8 from waist-line No. 3 through dot L to line No. 2; line No. 9 through dot Q from line No. 3 to line No. 2. These different lines form ordinates for other measurements, and also separate the different parts of the waist.

The next step is to obtain data for laying down the front of neck. This is done by making dot M on line 2 just two inches from the intersection of lines 9 and 2, and dot N on line 9 three inches from the junction of lines 9 and 2; then draw line 11 from M on line 2, parallel to line 9, as shown.

To form basis for shoulder, make dot O on line 1 three inches from the junction of lines Nos. 1 and 2, and from this point draw line No. 10 across the paper to dot N on line 9. This line forms the true basis for shoulder both back and front, also depth of neck in front.

Next mark width of back of neck by drawing broken line 12, one and one-half inch long, one-quarter inch above dot A, stopping at dot I, one-half inch above line 2. This line shapes the back of neck.

Next mark off the length of shoulder for back (which in these measures is six inches) by drawing line 16 from dot I to the intersection of lines 6 and 10. To form shoulder for front, which is always the same length as shoulder for back, I draw lines 17 from dot M to dot V six inches toward the intersection of lines 6 and 10.

I next obtain height of darts by making dot P on line 7 two inches below dot K on line 5. From this point draw line 13 to dot Q on line 9. To give a proper slope to the line of points of the darts, I make dot R on line 9 two inches below dot Q and draw a line from this point to dot P.

I next obtain length of waist in front by making dot S two inches below the junction of lines 3 and 9. From this point I draw line 15 to the intersection of lines 20 and 3. This is to give a proper shape to the waist in front.

Having laid the foundation for all the different parts of the waist with straight lines, I proceed to give each part its proper shape by using the various curves and lines on the square or scale according to their several adaptations.

First I shape the neck by drawing curve No. 1 with the part of square or scale marked N, measure this curve from N to M, add to this the length of line 12, and we have just one-half the neck-measure given on diagram, which proves the neck-measure to be correct.

I shape the arm-scye by making curve No. 2 with the curve on the square marked A, and which, from its form, is especially adapted for this particular purpose, placing edge of curve at point of shoulder for front, (marked V,) the point P of curve resting on line 7 one-half inch below dot K, the letter A on curve of square, or one-fourth inch inside of line 8. I draw the shape of the curve, and we have arm-scye for front.

For the back I reverse the curve A on the scale or square, the point P resting on line 7 one-half inch below dot K. Draw the shape of the curve to point of shoulder for back at dot V'. Measure the curve from dot V' at point of shoulder in back to dot V at point of shoulder in front, leaving out the space in the measurement from dot X to dot W. If this measure corresponds with the measure given, the result is correct.

I shape the different parts of the back by using the part of square marked B, placing the point W on dot E and the point X on dot W, and drawing shape of curve No. 5. Using the B part of square, I place the point W at dot D and the point X at dot X and draw curve No. 4, crossing curve No. 5. In this manner the space between dots X and W removes the unnecessary fullness so often seen at that particular point, giving an ugly shape to the back. Lines 18 19 20 21 are drawn with the S part of scale or square as indicated in the diagram.

I next obtain size of darts for front by measuring the sides and back pieces at waist-line, which have already been formed. Half the waist-measure being twelve inches, I subtract the number of inches obtained by measurement from 12, and the number will be the size required for the darts, and dividing this number by 2 gives the size of each dart. I next locate the darts by making dot Y on line 15 two inches from dot S, the size of each dart being at waist-line one and one-half inch wide. I make dot Z one and one-half inch from dot Y. This is the required width of first dart. I locate second dart three-fourths inch from first by making dot A A on line 15 three-fourths inch from dot Z, dot B B one and one-half inch from dot A A, dot C C and dot D D at the center of each dart. With the square I draw lines 23 and 24 from line 15 to line 14 through the dots D D and C C.

I shape the darts by using D part of square, placing its point X on line 14, at the junctions of lines 23 and 24, with line 14, and drawing curves Nos. 6, 7, 8, 9, in the manner indicated on the diagram.

To form a proper shape for front, I put dot G G one-half inch from line 9, at a point corresponding exactly with the height of second dart, and from this point draw broken line 22 upward to N and downward to dot S. Extend all the lines and curves to their necessary termination below the waist-line. This completes the draft.

If all directions for taking measures and drafting have been carefully complied with, the result will be a waist fitting perfectly without change of seam.

Having thus fully described my invention, what I claim, and desire to secure by Letters Patent, is—

A pattern chart and square for measuring and drafting dresses, provided with scales of inches, curved slots B N, and curved edges N S A, having the shape shown, and marked and graduated as specified, for the purposes set forth.

In testimony that I claim the foregoing as my own invention I affix my signature in presence of two witnesses.

LUCIE ROBINSON.

Witnesses:
EMMA TULLAR,
MORRIS PLACE.